(12) United States Patent
Kirk (10) Patent No.: US 8,232,916 B2
(45) Date of Patent: Jul. 31, 2012

(54) TILT COMPENSATION FOR GNSS ANTENNA

(75) Inventor: Geoffrey R. Kirk, Broomfield, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 154 days.

(21) Appl. No.: 12/770,289

(22) Filed: Apr. 29, 2010

(65) Prior Publication Data

US 2010/0283674 A1    Nov. 11, 2010

Related U.S. Application Data

(60) Provisional application No. 61/215,389, filed on May 5, 2009.

(51) Int. Cl.
*G01S 19/40*    (2010.01)
*G01S 19/42*    (2010.01)

(52) U.S. Cl. .............................. 342/357.23; 342/357.25
(58) Field of Classification Search ............... 342/357.2, 342/357.23, 357.25, 357.34, 357.44; 701/207, 701/213, 412, 469
See application file for complete search history.

(56) References Cited

U.S. PATENT DOCUMENTS

| | | | | |
|---|---|---|---|---|
| 6,034,643 | A | * | 3/2000 | Nishikawa et al. ........... 343/765 |
| 7,595,762 | B2 | * | 9/2009 | Mansour ....................... 343/757 |
| 2007/0159405 | A1 | * | 7/2007 | Eom .............................. 343/757 |

* cited by examiner

*Primary Examiner* — Dao Phan (57) ABSTRACT

A method and system of improving Global Navigation Satellite System (GNSS) results by compensating for antenna tilt in determining the location of the GNSS receiver is disclosed. In general, the angle of tilt of the antenna is determined. The actual elevation of a satellite is determined. The effective elevation of the satellite relative to the antenna is then calculated.

20 Claims, 8 Drawing Sheets

TILT COMPENSATION FOR GNSS ANTENNA

RELATED U.S. APPLICATION

This application claims priority to the provisional patent application Ser. No. 61/215,389, entitled "TILT COMPENSATION FOR ANTENNA MASK ON A GPS ANTENNA," with filing date May 5, 2009, assigned to the assignee of the present application, and hereby incorporated by reference in its entirety.

FIELD OF THE INVENTION

The present invention relates to a Global Navigation Satellite System or GNSS such as the Global Positioning System (GPS). In particular it relates to signal deviations for signals received from different satellites under different conditions

BACKGROUND OF THE INVENTION

In general, a Navigation Satellite System (NSS) refers to a position determining system that utilizes satellite-based position determining components or possibly a variety of terrestrial-based and satellite-based position determining components to determine a geographic position.

In one embodiment, the geographic position provided by the NSS describes the latitude and longitude at the receiving device's location. However, NSS's may also be used to determine elevation, speed, time, and the like. In most cases, the navigation satellite systems are global (e.g., GNSS), however, there are also NSS's that are regional (e.g, RNSS), local (e.g., LNSS) and the like. The present technology is well suited for use in one or a combination of NSS environments.

An NSS comprises a system of satellites that transmit information from which an observer's present location and/or the time of observation can be determined. GPS is one such GNSS, however the Russian Global Orbiting Navigational System (GLONASS), is an alternative or supplemental system and the European Galileo, the Indian Regional Navigational Satellite System (IRNSS), and Chinese Compass systems are also under development.

For ease of terminology the present application will refer to a Global Navigation Satellite System or GNSS, to refer to GPS, GLONASS, and to other satellite-based system that provides information by which an observer's position and the time of observation can be determined.

In particular, a GNSS uses the transmission of coded radio signals from a family of earth-orbiting satellites (up to 32 satellites for GPS) to calculate a receiver's position. A GNSS antenna receives GNSS signals from a plurality (preferably four or more) GNSS satellites and passes these signals to a GNSS signal receiver/processor, which identifies the GNSS satellite source for each GNSS signal, determines the time at which each identified GNSS signal arrives at the antenna, and determines the present location of the GNSS satellites, from which the receiver's location is calculated.

For example, in one embodiment the positions received from GNSS receivers, computed while the receiver's antenna is in a certain physical situation, can be recorded. This information can be used as observations for topographical surveying, mapping, set-out functions and the like.

SUMMARY OF THE INVENTION

According to the invention, there is provided a method and system of improving Global Navigation Satellite System (GNSS) results by compensating for antenna tilt in determining the location of the GNSS receiver is disclosed. In general, the angle of tilt of the antenna is determined. The actual elevation of a satellite is determined. The effective elevation of the satellite relative to the antenna is then calculated.

DETAILED DESCRIPTION OF THE INVENTION

Embodiments disclosed herein provide a method of improving Global Navigation Satellite System (GNSS) results by compensating for antenna tilt in determining the location of the GNSS receiver, comprising measuring the angle tilt of the antenna, determining the actual elevation of a satellite, and calculating the effective elevation of the satellite relative to the antenna. The effective elevation may be calculated by adding or subtracting the angle of tilt of the antenna from the actual elevation.

As an overview, the method may include determining the phase error of signals received from the satellite for the effective elevation of the satellite, and adjusting the value for the GNSS receiver location based on the phase error. The frequency at which antenna tilt measurements are made may correspond substantially to the frequency at which GNSS measurements are made to provide an updated tilt angle for each GNSS measurement, or may be lower or higher than the frequency at which GNSS measurements are made. The actual elevation of a satellite is typically defined as an angle relative to horizontal. The adding or subtracting of the antenna tilt from the actual elevation typically depends on whether the angle between the antenna and the satellite is increased or decreased by the tilt. The phase error may be determined by reference to a table or by calculating the error by extrapolating a curve based on a pre-defined set of results.

The method may further comprise applying a mask such as an Antenna Phase Model (APM) to compensate for errors related to satellite elevation. In such a case, the tilt angle may be introduced into the APM to define a tilt sensitive correction mask. Also, since antennae are designed to reject signals below a certain elevation (Elevation mask) their effect may be such that when tilted, the satellite vector (SV) is at an effective elevation on the antenna where the measurements may be expected to be so poor, they should not be used. In another example, it may be impossible to track the signal directly, and the receiver may track a bounced signal, which can cause significant errors.

Figure 1:
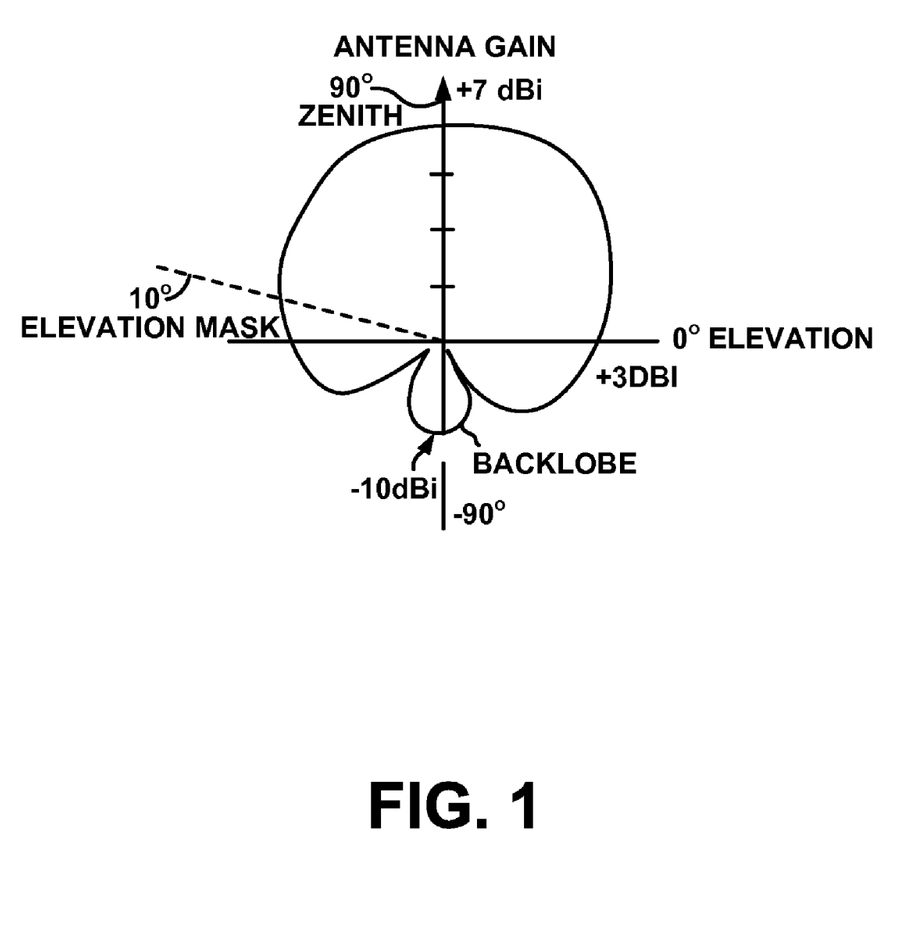
FIG. 1 is a gain diagram for an antenna in accordance with one embodiment of the present technology.

As is shown in FIG. 1, an antenna displays a certain gain pattern, which varies with elevation angle. At horizontal or 0 degrees elevation, the gain diagram of FIG. 1 shows a gain of 3 dBi, while at vertical or 90 degrees elevation it is 7 dBi. Typically gain is approximately uniform between 10° and 90° but due to the greater amount of atmosphere and increased ground bounce, noise tends to be greater below 10°. GNSS receivers often do not use SV's below a certain elevation; this is called an Elevation mask to take account of atmospheric and ground effects.

As a result, antennae are typically designed with a gain pattern having a pronounced roll-off below 10°. Furthermore, different antenna designs have different gain patterns and biases. The biases are consistent errors in the measurement of the phase of the incoming signal and are dependent on the vertical angle or elevation of the incoming signal.

On good antennae the phase response can have errors of 10-15 mm or more of phase shift. Since the phases of the signals received from the satellites are used for purposes of triangulating the location of the antenna and thus of the GPS or other GNSS receiver, it will be appreciated that the accuracy of the calculation for determining the geographic location of the antenna is directly related to the accuracy of the measured phase results.

Figure 2:
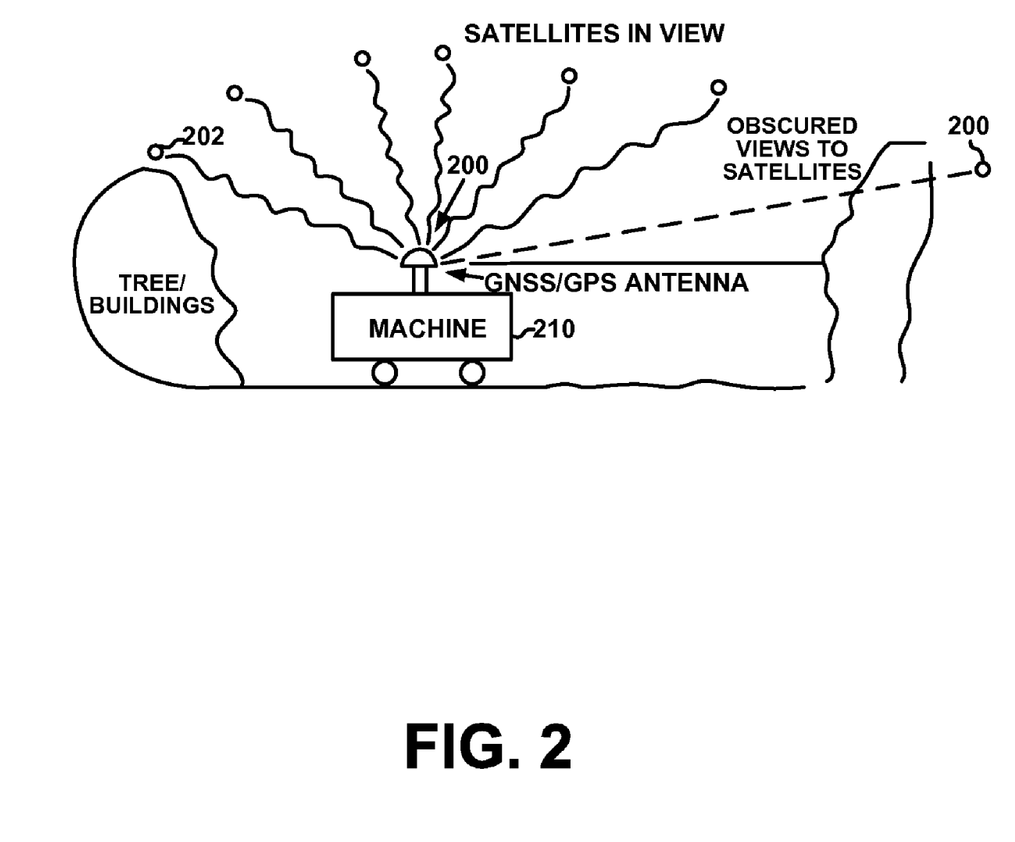
FIG. 2 shows a vehicle with a GNSS antennae exposed to multiple satellites in accordance with one embodiment of the present technology

Since signals from different satellites will be received from different elevations, antenna specific APM masks are introduced to compensate for phase differences or biases in signals received from satellites located at different elevations. Thus, as shown in FIG. 2, a GNSS receiver with antenna 200 may at a certain time of day be exposed to 7 satellites of which two satellites as depicted by numerals 202 and 204 are obscured by obstructions such as trees or buildings.

However, errors also creep in due to changing topography that causes the antenna angle to change (or tilt) relative to horizontal. The present technology provides improved results by compensating for errors introduced due to antenna tilt.

Figure 3:
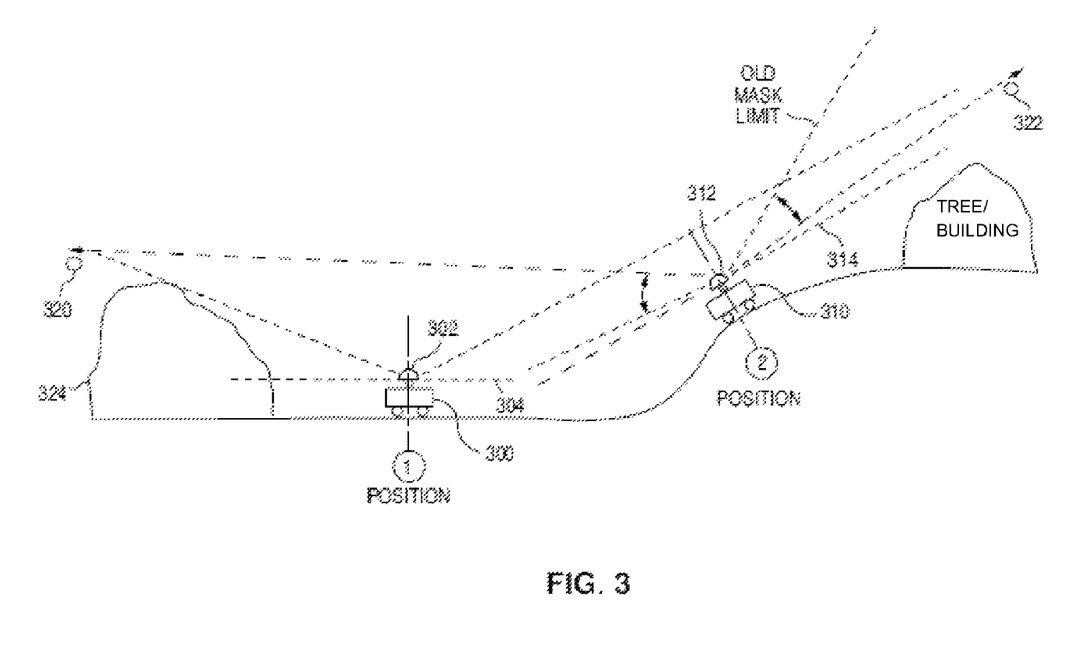
FIG. 3 shows two vehicles with GNSS antennae at different degrees of tilt in accordance with one embodiment of the present technology.

In order to illustrate the problems that arise in GNSS such as GPS operating in undulating terrain, FIG. 3 shows a first vehicle 300 on a horizontal plane and with its GPS antenna 302 pointing vertically so that the antenna's base plane 304 lies horizontally. This can be contrasted with the second vehicle 310 with its GPS antenna 312 located with its central axis at an incline of 40° to the vertical, the base plane 314 of the antenna thus also being tilted at an angle of 40° to the horizontal. Another way of looking at it is that the vertical axis in the case of antenna 302 is pointing vertically while the axis of antenna 312 is pointing 40° past vertical or 130° relative to the horizontal.

This can introduce errors in the readings due to antenna bias. It is common for different antennae to display different biases depending on the elevations of the signals. Therefore antennae typically compensate for phase errors in signals received by the GNSS antenna for different elevations of a satellite (in particular phase shifts that vary with elevation of the satellite above the horizontal). When the antenna is tilted or angled relative to horizontal or vertical the incoming SV signal comes in at a different angle relative to the antenna, which the existing bias compensation mask or APM fails to take into account. The present invention proposes correcting for errors caused by antenna tilt relative to vertical or relative to horizontal. In particular, in one embodiment the present invention adjusts the antenna's APM by subtracting the additional tilt angle. As discussed in further detail below, in one embodiment, in addition to the correction for antenna tilt, azimuth corrections are also made. In particular for antennae that are not consistent in bias based on the azimuth of the signal relative to the antenna in a horizontal plane is taken into account by including an algorithm to make azimuth corrections.

Due to ground bounce and other errors below 10° relative to the horizontal plane typically only satellite readings above 10° are considered. Although adjustable, many antennae are designed to reject SV signals below this elevation. Thus, in addition to an APM mask for the antenna there is a ground effect or atmospheric mask (also referred to as an Elevation mask) to reject readings below 10°. The present invention seeks to compensate for tilt by taking into account the amount of tilt, which in one embodiment is done by subtracting or adding the amount of tilt from the actual elevation angle in the APM The benefit of this will be appreciated when compared to results which don't take into account antenna tilt. For instance, when the antenna tilt is ignored, it is possible that SV's that are above 10 degrees from the horizon (above the atmospheric mask limit) are being measured in areas of the antenna that have very poor performance, or possibly involve the use of indirect signals. Knowledge of the antenna tilt allows for the processor to reject such signals.

Thus, without the tilt compensation of the present invention satellite readings that should be ignored (since they fall in areas of the antenna that have poor performance) may be included, while satellite vector readings that could be included (since they fall in areas of the antenna that have good performance) may be excluded. Considering vehicle 300, a prior art implementation provides for the inclusion of satellite 322 which falls within the mask limit defined by 10° above antenna base plane 304 (which in this case corresponds to the horizontal plane). Satellite 320 is excluded due to being obstructed by the trees 324.

Regarding vehicle 310, without tilt compensation the mask limits would be the same as for 300, i.e. the GNSS system calculates that satellite 320 would be too low on the horizon (below the 10° limit for the antenna) and should be excluded, while readings from satellite 322 should be included.

Figure 4:
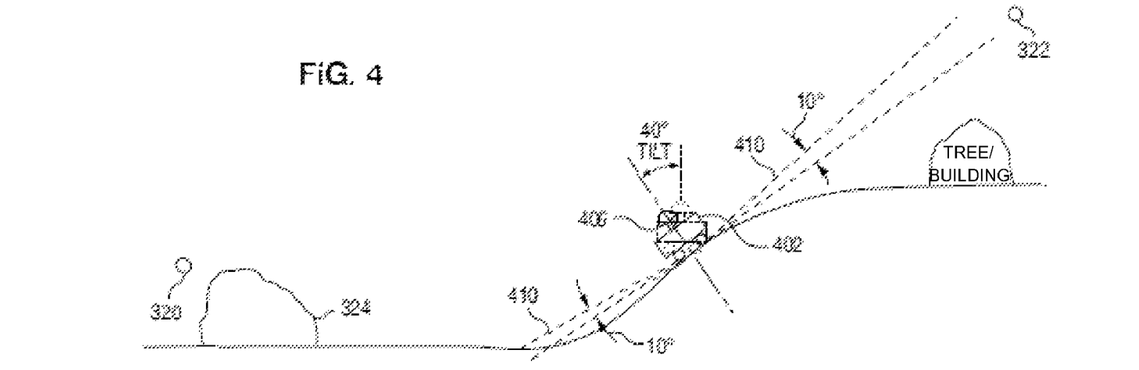
FIG. 4 shows a representation visualizing tilt compensation in accordance with one embodiment of the present technology.

With the compensation of the masks, tilt compensation would be introduced as shown in FIG. 4. Instead of making calculations as if the vehicle 310 were horizontal as depicted by outline 400, the mask compensation algorithm would take into account that the vehicle 310 is actually at an angle, e.g., 40° relative to the horizontal as depicted by outline 402 and that the antenna axis is therefore also at 40° relative to vertical. Thus, relative to the antenna axis, the satellite 320 would be above the 10° cut-off as depicted by line 410 and could be included as a good reading from the antenna's perspective. However, as discussed above, atmospheric effects require that the SV be above 10 degrees.

Taking both these factors into account would require that the readings from satellite 320 remain rejected. Satellite 322, in turn, would be excluded since it would fall outside the APM limits once the 40° tilt angle is subtracted from the actual satellite elevation as defined by the angle of the SV relative to horizontal. The present invention therefore compensates for the tilt of the antenna by adjusting for the calculated satellite elevation by an amount corresponding to the antenna tilt to define an effective satellite elevation.

Figure 5:
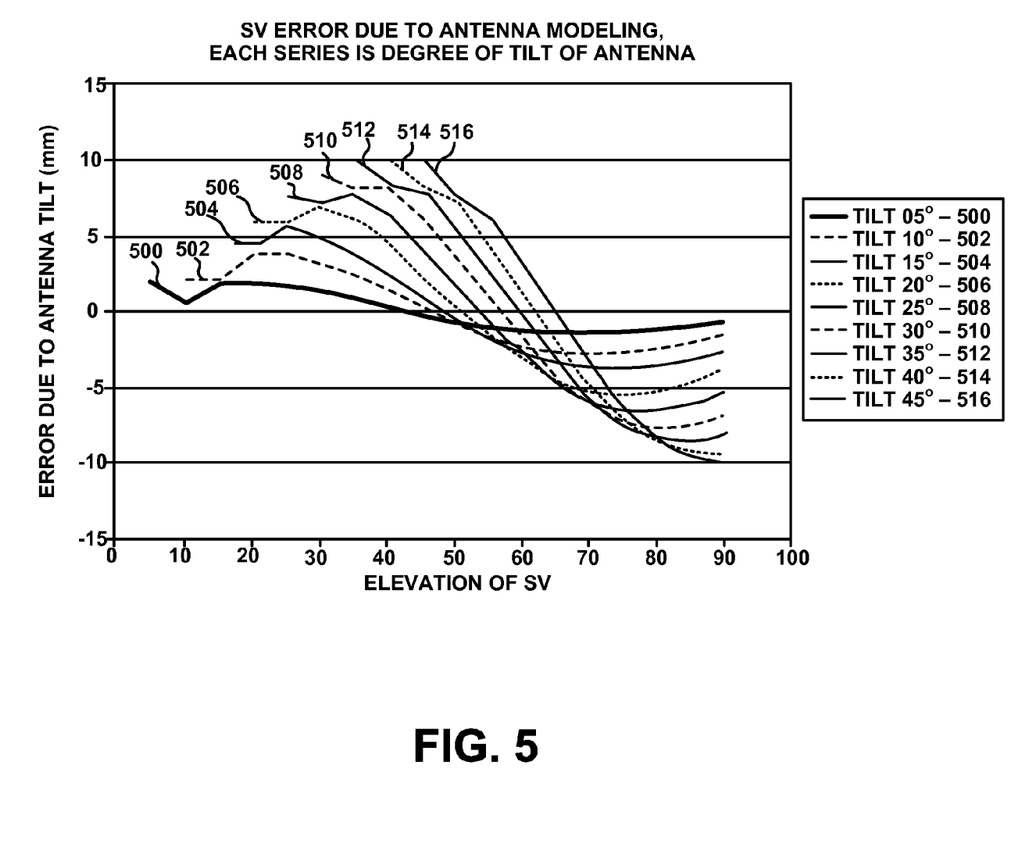
FIG. 5 shows curves for antenna tilt error vs. elevation of the satellite in accordance with one embodiment of the present technology.

The effect of measurement errors due to antenna tilt is best seen in the curves of FIG. 5 which show results for phase error in mm vs. satellite elevation above horizontal in degrees for various antenna tilts, for a typical high precision GNSS antenna. As the tilt of the antenna goes from 5° (curve 500) to 10° (curve 502) to 15° (curve 504) to 20° (curve 506) to 25°

(curve 508) to 30° (curve 510) to 35° (curve 512) to 40° (curve 514) to 45° (curve 516) the error can be seen to get more severe. Also, the maximum error values shift to the right with increasing tilt. In other words at larger tilt angles, the maximum error is not only greater but also occurs at greater elevations.

Thus, for instance at a tilt of only 5° the maximum error is not only much smaller than for a tilt of 45°, it also has its maximum at a much lower satellite elevation of about 15° compared to curve 516 which has its maximum error due to tilt at a satellite elevation of about 48°. Taking these errors for different antenna tilt and satellite elevations, a compensation algorithm is included in the mask to compensate for the tilt of the antenna for all satellites between 10 and 90 degrees above horizontal, to take into account the actual measurement locations on the antenna (relative elevations of the satellites), instead of the actual elevations of the satellites above the horizontal. The invention uses the tilt of the antenna to determine the measurement point on the antenna, for example if a SV is 50 degrees above the horizon (depicted by line 520) and the GNSS antenna is tilted at 20 degrees relative to the horizon (curve 506), along the vector of the SV path, the SV signal would be measured at either 70 (50+20) or 30 (50−20) degrees on the antenna.

FIG. 5 shows that the error due to the antenna measurement biases is approximately 6 to 7 mm In FIGS. 3 and 4 the tilt of the antenna was depicted as being caused by the pitch (front to back) of the vehicle due to an incline. It will be appreciated that the antenna tilt can also be side to side (cross fall or roll) which in practice is typically the more severe component. For purposes of this application the term tilt includes any angular movement of the antenna in a vertical plane. In one embodiment all tilt components are measured, e.g., using any known tilt measuring instrument, for example the Trimble AS400 angle sensor. In the case of a two-antenna vehicle, determining the tilt may include a vector between the antennae, using pitch from machine movement, a sensor or the like.

Figure 6:
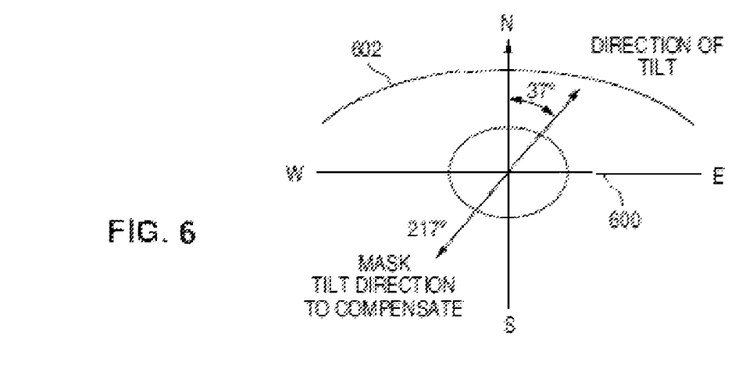
FIG. 6 shows a plan view depiction of angle tilt in accordance with one embodiment of the present technology.

It will be appreciated that the antenna may therefore be tilted in any direction between 0° (e.g., North) and 360° and that the satellite of interest may be at a certain elevation in a plane that lies at a different angle to the direction of tilt. For instance, as shown in FIG. 6, the angle may be tilted at 37° east of north. On other hand the path of one satellite may be in the east-west plane (as depicted by line 600) and be at a certain elevation at the time of the reading. Another satellite may follow a path in an east-west plane at a more northerly latitude and therefore follow a curve as depicted by reference numeral 602, from the antenna's perspective. Thus at a particular point in time the elevation and angle of the satellite relative to the antenna can be computed.

Insofar as the antennae does provide for significant variations in the horizontal plane, one embodiment also determines the error values due to the angles of the satellites in the horizontal plane relative to the antenna and makes azimuth corrections to take account of variations due to the position of the satellite relative to the antenna in this plane as well. Measurements of the particular antenna are taken in a 360° arc to determine the variations in gain and errors at different angles in the horizontal plane. A curve is then applied to the values to define an error curve and provide for compensation values for any angle in the horizontal plane. By including select compensation values and extrapolating from these or by determining an equation for the error curve, in addition to the tilt compensation discussed above, this embodiment allows azimuth corrections to be performed as well.

One embodiment incorporates the tilt of the antenna into the computed value for the Azimuth/Elevation of the SV signal to allow the direction of the SV signal relative to the antenna to be determined. Thus, in effect the correction to the normal measurement comprises determining the real direction of the SV relative to the antenna.

The error due to antenna Elevation/Azimuth changes can thus be computed or looked up in a table as indicated with respect to FIG. 5. Thus the error can be computed e.g., by extrapolating to a curve based on a few measured values, or can simply be determined from a lookup table, which in two dimensions depicts both Azimuth and Elevation.

Figure 7:
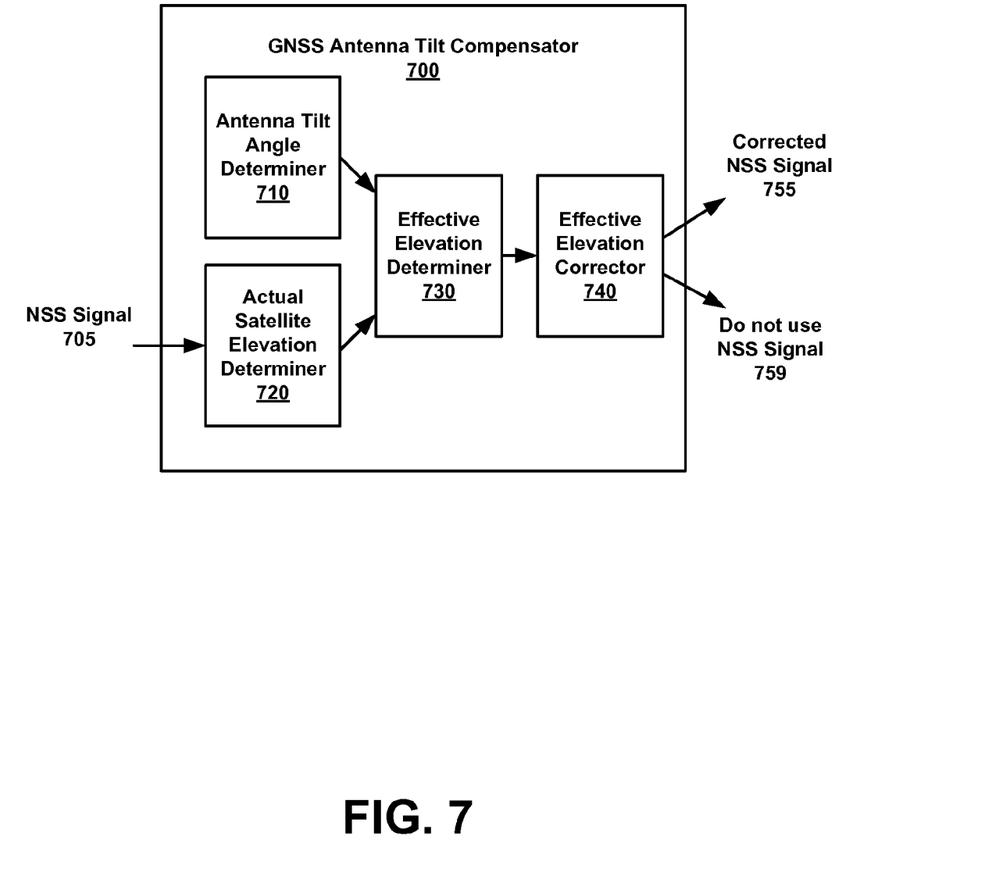
FIG. 7 is a block diagram of a GNSS antenna tilt compensator in accordance with one embodiment of the present technology.

With reference now to FIG. 7, a block diagram 700 of a GNSS antenna tilt compensator 700 is shown in accordance with one embodiment. In one embodiment, GNSS antenna tilt compensator 700 includes an antenna tilt angle determiner 710, an actual satellite elevation determiner 720, an effective elevation determiner 730 and an effective elevation corrector 740.

In one embodiment, antenna tilt angle determiner 710 may use any of a plurality of single or multiple antenna tilt angle determination methods to determine the antenna tilt angle.

In general, GNSS antenna tilt compensator 700 receives an NSS signal 705 which may be a satellite signal or the like as described in detail herein.

In one embodiment, the NSS signal 705 is provided to actual satellite elevation determiner 720. In another embodiment, the NSS signal 705 is provided to actual satellite elevation determiner 720 and effective elevation determiner 730. In one embodiment, the NSS signal 705 may include information that can be utilized by actual satellite elevation determiner 720 to determine the actual satellite elevation. In another embodiment, actual satellite elevation determiner 720 may utilize almanac information, a pre-loaded database, over-air transmitted information or the combination thereof to determine the actual satellite information.

Effective elevation determiner 730 receives input from antenna tilt angle determiner 710, actual satellite elevation determiner 720 and NSS signal 705 and utilizes the information, as described herein, to determine the effective satellite elevation.

Effective elevation corrector 740 evaluates the results from effective elevation determiner 730 and validates or invalidates the NSS signal 705 based on the evaluation. For example, effective elevation corrector 740 is preset with a 10 degree of elevation threshold. If the results from effective elevation determiner 730 provide an elevation that is less than 10 degrees, effective elevation corrector 740 does not validate the NSS signal and provides an do not use NSS signal 759 output.

However, if the results from effective elevation determiner 730 provide an elevation that is higher than 10 degrees, effective elevation corrector 740 then performs the corrections described herein to provide an antenna tilt corrected NSS signal 755.

Example Computing System

Figure 8:
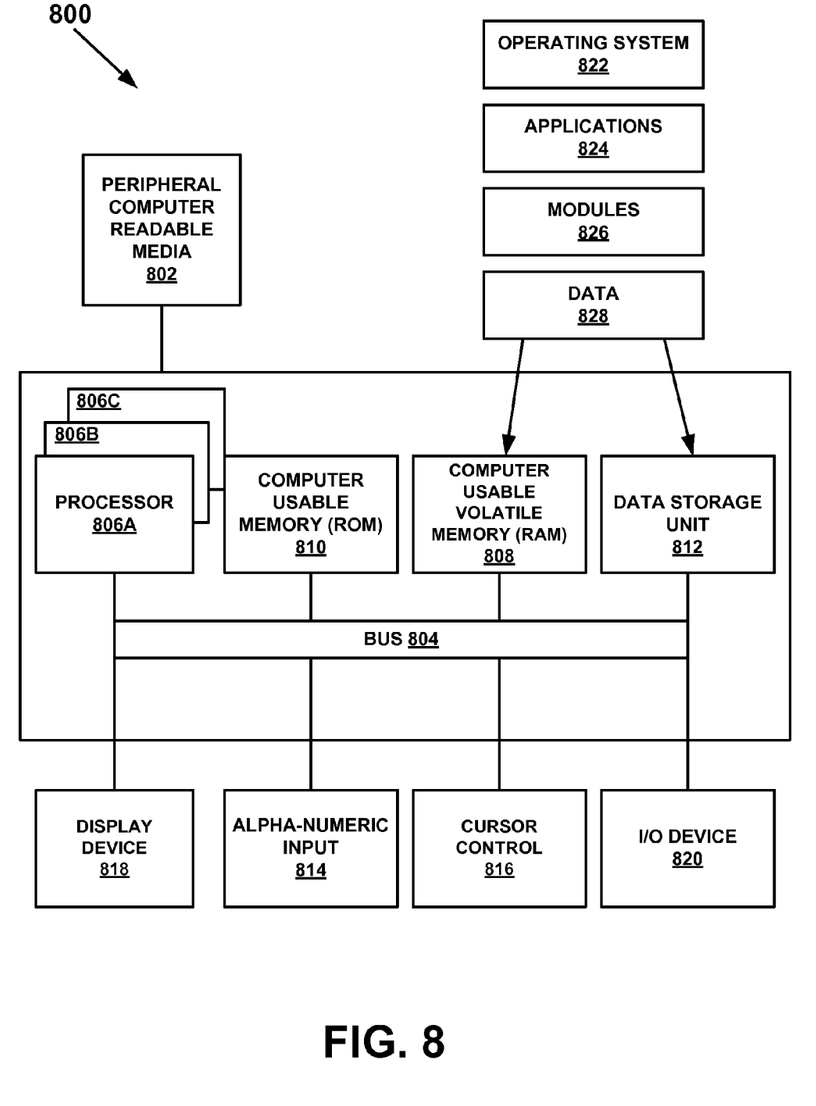
FIG. 8 is a block diagram of a computer system in accordance with one embodiment of the present technology.

With reference now to FIG. 8, portions of the technology may be composed of computer-readable and computer-executable instructions that reside, for example, on computer-usable media of a computer system. FIG. 8 illustrates an example of a computer system 800 that can be used in accordance with embodiments of the present technology. However, it is appreciated that systems and methods described herein can operate on or within a number of different computer systems including general purpose networked computer systems, embedded computer systems, routers, switches, server devices, client devices, various intermediate devices/nodes, standalone computer systems, and the like. For example, as shown in FIG. 8, computer system 800 is well adapted to having peripheral computer readable media 802 such as, for example, a floppy disk, a compact disc, flash drive, back-up drive, tape drive, and the like coupled thereto.

System 800 of FIG. 8 includes an address/data bus 804 for communicating information, and a processor 806A coupled to bus 804 for processing information and instructions. As depicted in FIG. 8, system 800 is also well suited to a multi-processor environment in which a plurality of processors 806A, 806B, and 806C are present. Conversely, system 800 is also well suited to having a single processor such as, for example, processor 806A. Processors 806A, 806B, and 806C may be any of various types of microprocessors. System 800 also includes data storage features such as a computer usable volatile memory 808, e.g. random access memory (RAM) (e.g., static RAM, dynamic, RAM, etc.) coupled to bus 804 for storing information and instructions for processors 806A, 806B, and 806C. System 800 also includes computer usable non-volatile memory 810, e.g. read only memory (ROM) (e.g., read only memory, programmable ROM, flash memory, EPROM, EEPROM, etc.), coupled to bus 804 for storing static information and instructions for processors 806A, 806B, and 806C. Also present in system 800 is a data storage unit 812 (e.g., a magnetic or optical disk and disk drive, solid state drive (SSD), etc.) coupled to bus 804 for storing information and instructions.

System 800 also includes an alphanumeric input device 814 including alphanumeric and function keys coupled to bus 804 for communicating information and command selections to processor 806A or processors 806B, and 806C. System 800 also includes a cursor control device 816 coupled to bus 804 for communicating user input information and command selections to processor 806A or processors 806B, and 806C. System 800 of the present embodiment also includes a display device 818 coupled to bus 804 for displaying information. In another example, alphanumeric input device 814 and/or cursor control device 816 may be integrated with display device 818, such as for example, in the form of a capacitive screen or touch screen display device 818.

Referring still to FIG. 8, optional display device 818 of FIG. 8 may be a liquid crystal device, cathode ray tube, plasma display device or other display device suitable for creating graphic images and alphanumeric characters recognizable to a user. Cursor control device 816 allows the computer user to dynamically signal the movement of a visible symbol (cursor) on a display screen of display device 818. Many implementations of cursor control device 816 are known in the art including a trackball, mouse, touch pad, joystick, capacitive screen on display device 818, special keys on alpha-numeric input device 814 capable of signaling movement of a given direction or manner of displacement, and the like. Alternatively, it will be appreciated that a cursor can be directed and/or activated via input from alpha-numeric input device 814 using special keys and key sequence commands. System 800 is also well suited to having a cursor directed by other means such as, for example, voice commands, touch recognition, visual recognition and the like. System 800 also includes an I/O device 820 for coupling system 800 with external entities. For example, in one embodiment, I/O device 820 enables wired or wireless communications between system 800 and an external network such as, but not limited to, the Internet.

Referring still to FIG. 8, various other components are depicted for system 800. Specifically, when present, an operating system 822, applications 824, modules 826, and data 828 are shown as typically residing in one or some combination of computer usable volatile memory 808, e.g. random access memory (RAM), and data storage unit 812.

Example GNSS Receiver

Figure 9:
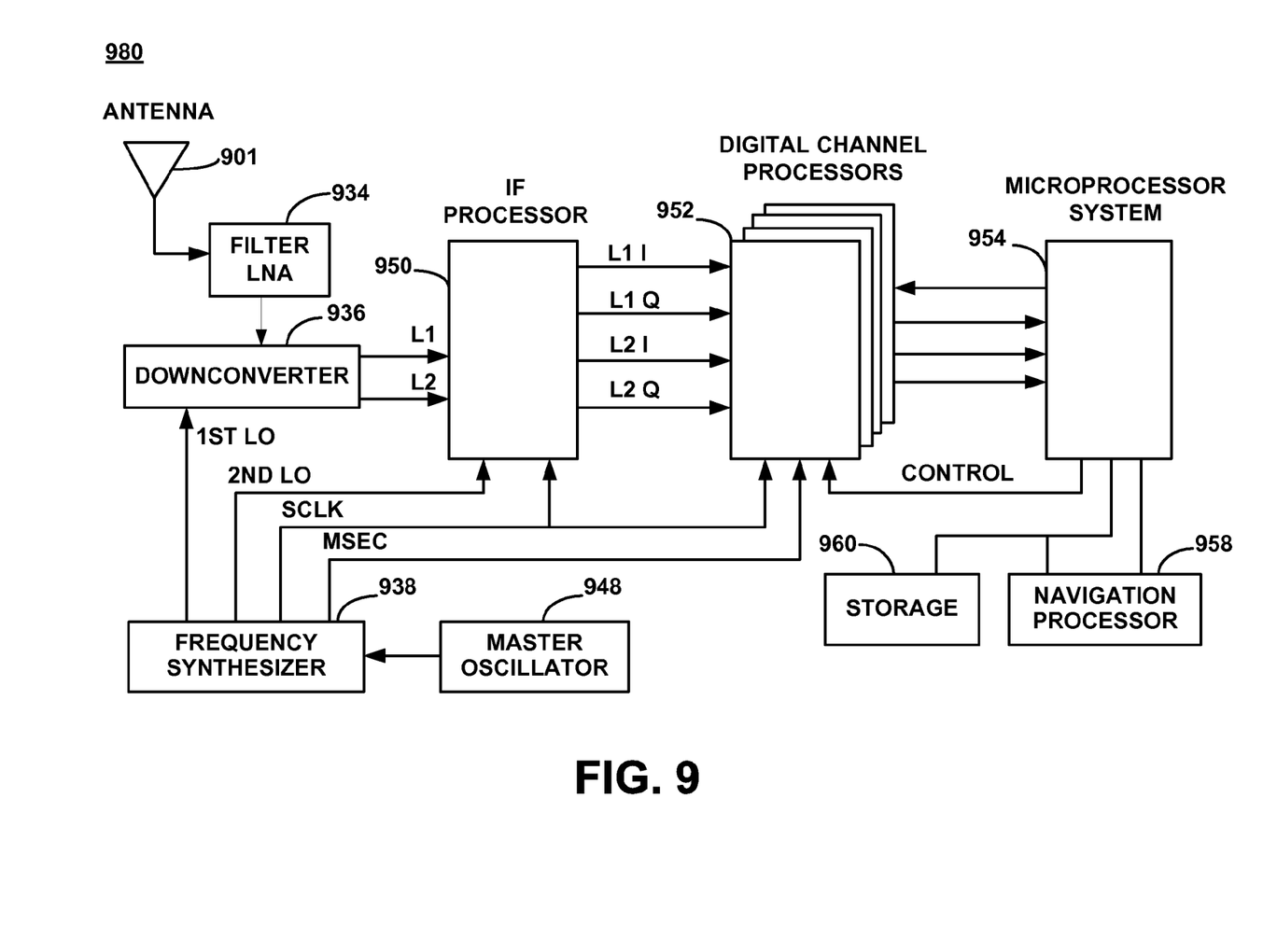
FIG. 9 is a block diagram of an example NSS receiver which may be used in accordance with one embodiment of the present technology.

With reference now to FIG. 9, a block diagram is shown of an embodiment of an example GNSS receiver which may be used in accordance with various embodiments described herein. In particular, FIG. 9 illustrates a block diagram of a GNSS receiver in the form of a general purpose GPS receiver 980 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s).

Embodiments of the present technology may be utilized by GNSS receivers which access the L1 signals alone, or in combination with the L2 signal(s). A more detailed discussion of the function of a receiver such as GPS receiver 980 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 980 of FIG. 9.

In FIG. 9, received L1 and L2 signal is generated by at least one GPS satellite. Each GPS satellite generates different signal L1 and L2 signals and they are processed by different digital channel processors 952 which operate in the same way as one another. FIG. 9 shows GPS signals (L1=1575.42 MHz, L2=1227.60 MHz) entering GPS receiver 980 through a dual frequency antenna 901. Antenna 901 may be a magnetically mountable model commercially available from Trimble® Navigation of Sunnyvale, Calif., 94085. Master oscillator 948 provides the reference oscillator which drives all other clocks in the system. Frequency synthesizer 938 takes the output of master oscillator 948 and generates important clock and local oscillator frequencies used throughout the system. For example, in one embodiment frequency synthesizer 938 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 934 performs filtering and low noise amplification of both L1 and L2 signals. The noise figure of GPS receiver 980 is dictated by the performance of the filter/LNA combination. The downconverter 936 mixes both L1 and L2 signals in frequency down to approximately 175 MHz and outputs the analogue L1 and L2 signals into an IF (intermediate frequency) processor 30. IF processor 950 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 952 inputs the digitally sampled L1 and L2 inphase and quadrature signals. All digital channel processors 952 are typically identical by design and typically operate on identical input samples. Each digital channel processor 952 is designed to digitally track the L1 and L2 signals produced by one satellite by tracking code and carrier signals and to form code and carrier phase measurements in conjunction with the microprocessor system 954. One digital channel processor 952 is capable of tracking one satellite in both L1 and L2 channels.

Microprocessor system 954 is a general purpose computing device which facilitates tracking and measurements processes, providing pseudorange and carrier phase measurements for a navigation processor 958. In one embodiment, microprocessor system 954 provides signals to control the operation of one or more digital channel processors 952. Navigation processor 958 performs the higher level function of combining measurements in such a way as to produce position, velocity and time information for the differential and surveying functions. Storage 960 is coupled with navigation processor 958 and microprocessor system 954. It is appreciated that storage 960 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

It will therefore be appreciated that the present invention is not limited to the particular embodiments discussed above but could be implemented in different ways without departing from the scope of the invention as defined by the claims.

What is claimed is:

1. A computer-implemented method of improving Global Navigation Satellite System (GNSS) results by compensating for antenna tilt in determining a location of a GNSS receiver, said method comprising:
   determining, at a computer system, an angle of tilt of an antenna;
   determining, at said computer system, an actual elevation of a satellite;
   calculating, at said computer system, an effective elevation of the satellite relative to the antenna; and
   calculating, at said computer system, the effective elevation by adding or subtracting the angle of tilt of the antenna from the actual elevation.

2. The method of claim 1, further comprising:
   adding or subtracting of the angle of tilt from the actual elevation depending on whether the angle between the antenna and the satellite is increased or decreased by the tilt.

3. The method of claim 1, further comprising:
   determining a phase error of signals received from the satellite for the effective elevation of the satellite, and adjusting a value for a GNSS receiver location based on the phase error.

4. The method of claim 3, further comprising:
   utilizing a reference table to determine the phase error.

5. The method of claim 3, further comprising:
   calculating the error by extrapolating a curve based on a pre-defined set of results.

6. The method of claim 3, further comprising:
   determining an azimuth of the satellite and calculating the phase error caused by antenna bias in a horizontal plane.

7. The method of claim 1, further comprising:
   utilizing a substantially corresponding frequency at which angle of tilt measurements of the antenna are made with respect to the frequency at which GNSS measurements are made to provide an updated tilt angle for each GNSS measurement.

8. The method of claim 1, further comprising:
   utilizing a lower or higher frequency at which angle of tilt measurements are made than a frequency at which GNSS measurements are made.

9. The method of claim 1, further comprising:
   defining the actual elevation of a satellite as an angle in a vertical plane relative to horizontal.

10. The method of claim 1, further comprising:
    applying a mask antenna phase model (APM) to discard satellite signals falling outside the mask.

11. The method of claim 10, further comprising:
    introducing an angle correction due to angle of tilt into the mask APM to define a tilt sensitive mask.

12. The method of claim 1, further comprising:
    determining the angle of tilt in a single antenna system by measuring the tilt using a sensor.

13. The method of claim 1, further comprising:
    determining the angle of tilt in a two-antenna system from a vector between the antennae.

14. A Global Navigation Satellite System (GNSS) antenna tilt compensator comprising:
    an antenna tilt angle determiner;
    an actual satellite elevation determiner;
    an effective elevation determiner communicatively coupled with the antenna tilt angle determiner and actual satellite elevation determiner to determine an effective elevation of a satellite providing a GNSS signal; and
    an effective elevation corrector communicatively coupled with the effective elevation determiner to validate and provide an antenna tilt angle correction to the GNSS signal if the effective elevation of the satellite providing the GNSS signal is higher than an effective elevation threshold.

15. The GNSS antenna tilt compensator of claim 14, wherein the antenna tilt angle determiner utilizes a sensor to determine the antenna tilt angle in a single or multiple antenna configuration.

16. The GNSS antenna tilt compensator of claim 14, wherein the antenna tilt angle determiner utilizes a vector analysis between the antennae to determine the antenna tilt angle in a multiple antennae configuration.

17. The GNSS antenna tilt compensator of claim 14, wherein the GNSS signal is received and utilized by the actual satellite elevation determiner.

18. The GNSS antenna tilt compensator of claim 14, wherein the GNSS signal is received and utilized by the effective elevation determiner.

19. The GNSS antenna tilt compensator of claim 14, wherein the actual satellite elevation determiner determines the actual satellite information from the group consisting of: almanac information, a pre-loaded database, an over-air transmission.

20. The GNSS antenna tilt compensator of claim 14, wherein the effective elevation corrector is preset with a degree of elevation threshold and the GNSS signal is not validated if a result from effective elevation determiner provides an elevation that is lower than the degree of elevation threshold.

* * * * *